June 24, 1958
C. D. HOLTON
2,840,195
BRAKE DRUM
Filed June 3, 1953
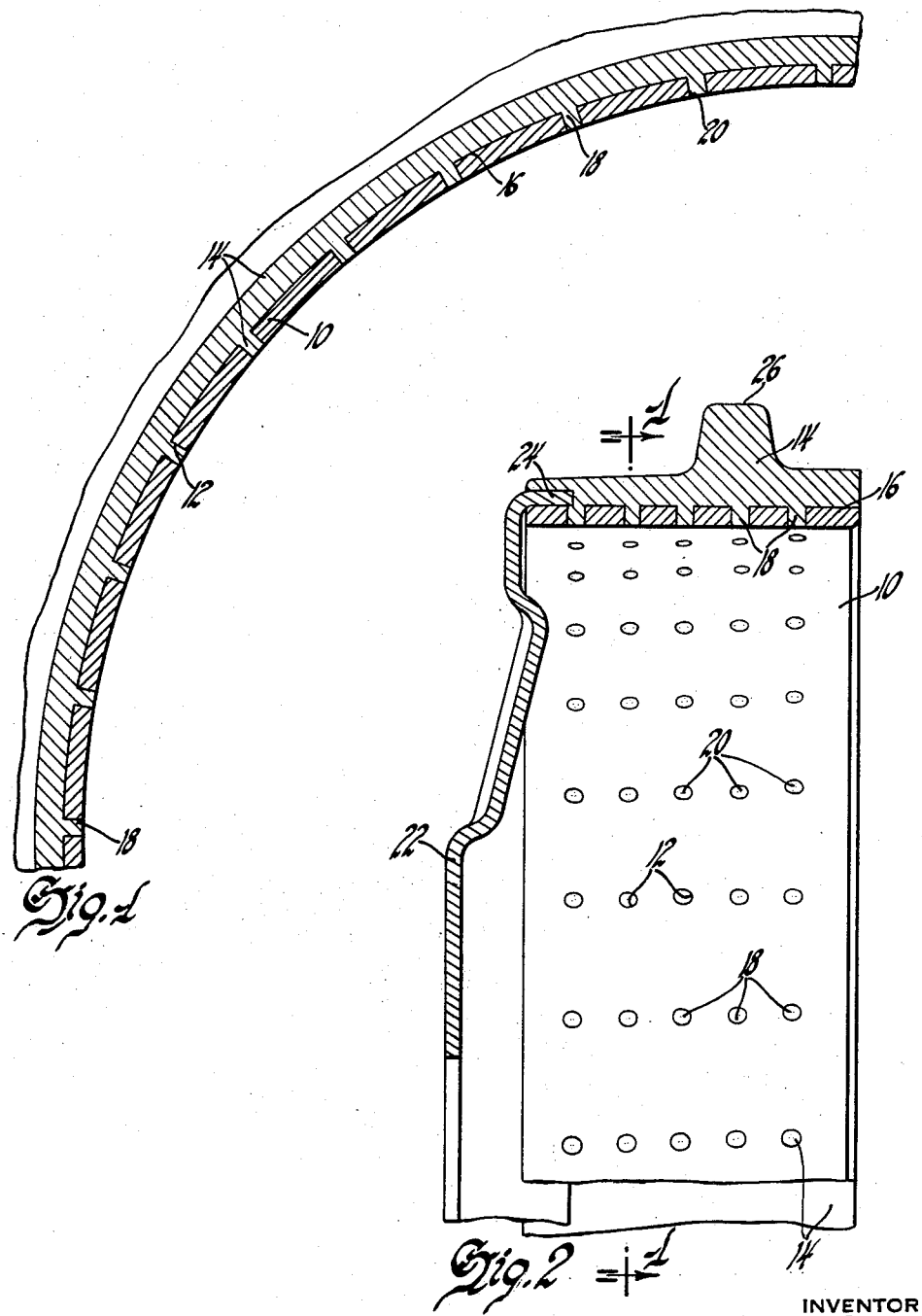
INVENTOR
Charles D. Holton
BY
J. E. Ross
ATTORNEY

United States Patent Office 2,840,195
Patented June 24, 1958

2,840,195

BRAKE DRUM

Charles D. Holton, Clio, Mich., assignor to General Motors Corporation, Detroit, Mich., a corporation of Delaware Application June 3, 1953, Serial No. 359,289

8 Claims. (Cl. 188—218)

This invention relates to improvements in frictional wear surfaces and more particularly to an improved brake drum structure and its manufacture.

One of the most difficult problems encountered in the design of vehicle and aircraft brakes is the disposal of frictional heat generated when the brakes are applied. Prior attempts to improve the dissipation of frictional heat have generally been directed toward providing a larger radiating surface. In many instances, the area of the radiating surface has been increased and improved brake action obtained by increasing the size of the brake drum. In other applications, heat-resistant brake materials have been employed to minimize the difficulties encountered when brake temperatures exceed certain predetermined limits.

However, in recent years the speeds at which vehicles are operated have increased tremendously. Moreover, the size of vehicle tires also has increased, thus reducing the space available within the wheel where brake drums and other hydraulic brake mechanism parts conventionally are mounted. A similar problem is encountered in the construction of aircraft brakes where not only are extremely high speeds involved but tremendous brake loads as well. As a result, while there is an ever increasing need for more efficient braking action and a better dissipation of frictional heat, the space available for mounting such brake structure is limited.

Accordingly, a principal object of the present invention is the provision of an improved wear surface adapted to facilitate dissipation of frictional heat. A further object is the provision of an improved brake drum structure adapted to provide an improved heat transmission therethrough without impairing the strength or frictional characteristics of the wear surface.

These and other advantages of the invention will appear more fully from the following description taken in connection with the accompanying drawing illustrating a preferred embodiment of the invention, in which:

Fig. 1 is a fragmentary sectional view substantially taken along lines 1—1 of Fig. 2 of a frictional wear surface embodying the present invention; and Fig. 2 is a fragmentary schematic sectional view of a brake drum formed in accordance with the present invention.

Hard, wear-resistant materials such as cast iron, steel and the like have long been used to form brake drum wear surfaces. These hard materials provide the surface characteristics necessary to the proper operation of braking devices. However, such hard materials do not have high heat conductivities and as a result their heat transmission characteristics do not permit the rapid dissipation of heat therethrough. On the other hand, those materials having high heat conductivities such as silver, aluminum, nickel, etc., are generally considered to be poorly adapted for use as frictional wear surfaces. However, I have now discovered that a greatly improved frictional wear surface is provided by employing a wear liner of cast iron, steel or other material having the desired wear properties, and backing this wear liner with a highly heat conductive material such as aluminum in such a manner that the backing extends through a multiplicity of perforations over the surface of the liner to provide a composite wear surface. The resultant wear surface hence comprises alternating areas of backing material and hard wear material. Such a surface not only maintains the desirable frictional wear characteristics of the hard wear liner, but also greatly facilitates the dissipation of heat by providing an improved heat transmission path through the brake drum.

A preferred embodiment of the present invention is shown in the accompanying drawing and includes a hard wear liner 10 typically of cast iron, steel, or the like. This wear liner 10 preferably is formed by a centrifugal casting operation and is thereafter drilled radially to provide a multiplicity of perforations 12 distributed circumferentially and longitudinally with respect to the liner axis. A backing material 14 formed of aluminum, aluminum alloy or other highly heat conductive metal or alloy is bonded to the outer surface 16 of the wear liner. As shown in Figs. 1 and 2, portions 18 of the heat conductive backing extend through the perforations 12 in the wear liner 10 to provide highly heat conductive areas 20 in the composite wear surface which is best illustrated in Fig. 2.

A composite wear surface embodying the present invention comprises the combination of a wear liner surface and a mutliplicity of small surface areas 20 of heat conductive material which are distributed throughout the entire usable surface of the liner 10. In practice, a preferred combination is a hard wear material such as cast iron or steel and an aluminum or aluminum alloy backing material. Optimum results are obtained by employing as a backing layer a substance having a heat conductivity greatly in excess of the heat conductivity of the wear material. As a result, transfer of the frictional heat generated in braking operations is greatly facilitated by providing a highly heat conductive material actually in contact with the brake shoe or corresponding rubbing surface at the situs of heat generation.

As shown in Fig. 2, a brake drum formed in accordance with the present invention preferably comprises a drum head 22 usually formed of pressed metal, a hardened wear liner 10 and highly heat conductive material centrifugally cast through the perforations 12 in the wear liner 10, and about the flanged portion 24 of the drum head 22. A circumferential reinforcing rib 26 is formed in the casting operation to increase the strength and rigidity of the brake drum.

The manufacture of a brake drum embodying the present invention involves certain difficulties which I have succeeded in overcoming by employing the following method. A hardened wear liner, drilled radially to provide the desired area of perforation is positioned together with the drum head in a centrifugal type mold. The molten backing material, typically an aluminum alloy, is then introduced into the center of the rapidly rotating brake drum structure and quickly flows through the perforations to fill the mold cavity where it is allowed to solidify, thus forming a strong unitary brake drum. In practice, the backing material is generally allowed to over fill the mold cavity to form a coating over the inner surface of the wear liner. This coating is then removed by machining or the like to expose the desired composite wear surface and to obtain the required brake drum dimensions.

Because of the novel structural features of the present invention it will be observed that the brake drum structure shown in Fig. 2 provides, in addition to any chemical or molecular bond obtained in casting, an interlocking effect to securely mechanically bond the backing material to the drum head and wear liner.

Although no special bonding or flux coatings are necessary to obtain proper adhesion between the backing material and the wear liner, I have found that superior results are obtained in the centrifugal casting operation if the centrifugal mold, the drum head, and the wear liner are preheated to preclude a premature solidification of the molten metal as it flows into the mold cavity through the perforations in the wear liner. The temperature to which the mold structure should be preheated depends, of course, on the particular backing material employed. However, I have found that in using aluminum alloy type backing materials a temperature within the range of at least 300° F. and not in excess of about 1100° F. can be used, with a temperature within the range of about 350° F. to 425° F. preferred at present.

At times, depending upon the type of wear liner employed and the particular application, it may be desirable to provide a protective coating on the wear liner to prevent oxidation thereof during any preheating or molding operations. Typical of suitable materials which can be employed as protective coatings are tin, copper and their alloys. In practice, such metals or alloys can be applied by electrodeposition.

While the wear liner has thus far been described in some detail as being a centrifugally cast liner, it will be understood that the invention is not to be so limited, and that in many instances, other types of wear liners can be used, such for example, as those formed from sheet metal, from tubular stock, or by powder metallurgy techniques.

The expression "aluminum alloy" as used herein is intended to mean an alloy whose primary constituent is aluminum. Similarly, the term "aluminum" is intended to include various commercial grades of aluminum which usually contain minor proportions of other constituents.

While the embodiment of the present invention as herein disclosed constitutes a preferred form, it is to be understood that other forms might be adopted, all coming within the scope of the claims which follow.

What is claimed is:

1. A brake drum comprising a sheet metal drum head in the general form of a disk, a cylindrical hard wear liner extending axially from said drum head and an annulus of backing material having a heat conductivity higher than that of said liner bonded to said liner over susbtantially the entire outer surface thereof, said wear liner having a multiplicity of perforations therein distributed both laterally and circumferentially throughout its entire surface through which said backing material extends to the inner surface of said liner to provide a composite brake wear surface having improved heat transfer characteristics consisting of alternating areas of solid backing material and heat conductive material, said annulus of backing material also anchoring said sheet metal drum head at the outer peripheral portion thereof.

2. A brake drum comprising a drum head in the general form of a disk having an outer peripheral flange, a one-piece, annular, cast iron wear liner having a multiplicity of perforations extending radially therethrough, said perforations being spaced both axially and circumferentially throughout the entire braking area of said liner, and a continuous body of backing material of higher heat conductivity than said liner thermally engaging substantially the entire outer surface of said liner for support of the liner and extending completely through each of said perforations to the inner surface of the liner to provide a continuous composite wear surface consisting of alternating areas of high heat conductive backing material and lower heat conductive wear liner, said body of backing material also anchoring said drum head flange.

3. A composite brake drum comprising a drum head member, a one-piece, annular, wear-resistant liner extending axially from said member, said liner having a multiplicity of perforations extending therethrough, said perforations being spaced both laterally and circumferentially throughout the entire braking surface of said liner, and a continuous body of backing material selected from the class consisting of aluminum and aluminum alloys having a higher heat conductivity than said liner bonded to said liner on substantially the entire outer face thereof for support of the liner and extending completely through said perforations to the inner surface of the liner to provide a composite wear surface consisting of alternating areas of high heat conductive backing material and said liner, said body of backing material also anchoring said drum head member at the outer peripheral portion thereof.

4. The method of manufacture of a composite brake drum of a type comprising a drum head of generally disk shape assembled with a cylindrical wear liner that extends axially of the said head and having a multiplicity of perforations in the liner disposed both laterally and circumferentially of the entire braking area of the liner with a backing material of higher heat conductivity than the liner surrounding the liner in thermal engagement therewith and supporting the liner with the backing material extending through the perforations to at least the inside surface of the liner, said method comprising the steps of, forming a wear liner of wear resistant material in the form of a cylinder with a multiplicity of perforations in the entire braking area of the liner spaced both axially and circumferentially throughout the liner, disposing the so-formed liner and a drum head of generally disk shape in a mould with the liner extending axially of the drum head coaxial therewith and spaced radially from the wall of the mould, heating the mould and the liner and the drum head to establish an elevated pre-heat temperature therein when the liner and drum head are in assembly in the mould, flowing a molten backing material of higher heat conductivity than the liner into the interior of the liner while rapidly rotating the mould containing the liner and drum head to centrifuge the molten backing material into the space between the liner and the mould to fill the same around substantially the entire outer peripheral surface of the liner and also fill the perforations in the liner to at least the inner surface of the liner, also centrifuging the molten backing material around the outer peripheral portion of said drum head and thereafter causing setting of the backing material through cooling with resultant attachment of the backing material to the liner and to said drum head portion with the backing material extending to the inner peripheral surface of the liner through the perforations therein providing thereby heat dissipating areas of high conductivity over the entire braking surface of the liner.

5. The method of manufacture of a composite brake drum as set forth in claim 4 in which the wear liner is initially coated with a thin layer of a metal selected from the group of tin and copper.

6. The method of manufacture of a composite brake drum as set forth in claim 4 in which the heat conductive backing material is a metal selected from the group of aluminum and aluminum alloys.

7. The method of manufacture of a composite brake drum as set forth in claim 4 in which the liner is pre-heated within a range of 300° F. to 1100° F.

8. The method of manufacture of a composite brake drum as set forth in claim 4 in which the liner is initially coated with the metal of the class consisting of tin and copper and the liner is pre-heated to a temperature within the range of about 350° F. to 425° F.

References Cited in the file of this patent

UNITED STATES PATENTS

| | | |
|---|---|---|
| 1,553,670 | Cantley | Sept. 15, 1925 |
| 1,670,320 | Thompson | May 22, 1928 |
| 1,998,709 | Dake | Apr. 23, 1935 |
| 2,046,369 | Dake | July 7, 1936 |

(Other references on following page)

UNITED STATES PATENTS

| | | |
|---|---|---|
| 2,109,110 | Frank | Feb. 22, 1938 |
| 2,115,980 | Sinclair | May 3, 1938 |
| 2,123,181 | Deputy | July 12, 1938 |
| 2,191,607 | Chamberlin et al. | Feb. 27, 1940 |
| 2,275,503 | Brown | Mar. 10, 1942 |
| 2,506,823 | Wyant | May 9, 1950 |
| 2,543,936 | Reynolds | Mar. 6, 1951 |
| 2,563,769 | Wyant | Aug. 7, 1951 |
| 2,672,666 | Enfer et al. | Mar. 23, 1954 |

FOREIGN PATENTS

| | | |
|---|---|---|
| 560,903 | Great Britain | Apr. 26, 1944 |